United States Patent [19]

Even et al.

[11] Patent Number: 4,567,687

[45] Date of Patent: Feb. 4, 1986

[54] FISHING DIVER WITH SLIDE-THROUGH LINE

[76] Inventors: Randy P. Even, 4226 S. 13 St.; Douglas H. Grube, 1111A N. 16 St., both of Sheboygan, Wis. 53081

[21] Appl. No.: 656,880

[22] Filed: Oct. 2, 1984

[51] Int. Cl.[4] ............................................. A01K 95/00
[52] U.S. Cl. .................................................. 43/43.13
[58] Field of Search ................... 43/43.13, 42.04, 42.49

[56] References Cited

U.S. PATENT DOCUMENTS

| | | | |
|---|---|---|---|
| 2,247,583 | 7/1941 | Louthan | 43/52 |
| 2,273,209 | 2/1942 | Louthan | 43/52 |
| 3,181,266 | 5/1961 | Leufvenius | 43/43.13 |
| 3,524,277 | 8/1970 | Neubert | 43/43.13 |
| 3,643,370 | 2/1972 | Cook | 43/43.13 |
| 3,755,955 | 9/1973 | Saia | 43/43.13 |
| 3,813,809 | 6/1974 | Frotiee | 43/43.13 |
| 3,844,059 | 10/1974 | Weber | 43/43.13 |
| 3,898,759 | 8/1975 | Jensen | 43/43.13 |
| 3,940,872 | 3/1976 | Weber | 43/43.13 |
| 4,320,592 | 3/1982 | Kirsch | 43/43.13 |

*Primary Examiner*—Gene P. Crosby
*Attorney, Agent, or Firm*—Andrus, Sceales, Starke & Sawall

[57] ABSTRACT

A fishing diver (2) is provided by a diving plane (4) with an upstanding fin (32), and releaseable latch means (14) having a latched condition clamping the diving plane to the line such that upon trolling the diver dives downwardly at an angle to the trolling line, and having a released condition responsive to the strike of a fish unclamping the diving plane from the line and providing free sliding passage of the line through guide means (8) along the plane of the diving plane.

11 Claims, 4 Drawing Figures

FISHING DIVER WITH SLIDE-THROUGH LINE

BACKGROUND AND SUMMARY

The invention relates to a fishing diver or sinker for carrying bait or a lure down to deeper depths when trolling.

The invention provides a diver which is clamped to a fishing line extending therethrough. In the latched condition, the diver is locked onto the line. In the unlatched condition, the diver may freely slide along the line. When the fish bites, the latch trips, and the line slides freely through the diver, whereby the fish need not pull the diver along with it, which otherwise may result in increased line breakage.

The line length between the diver and the fish is adjustable, which may be desirable for differing locales or for certain types of fish. Regardless of the line length between the diver and the fish, when the fish bites and the latch is released, the fish is directly reeled in and netted because the trolling line extends through the diver and is also the baiting line. In contrast, if a first trolling line is tied to the front of the diver, and a second separate baiting line is tied to the rear of the diver, the length of the baiting line cannot be greater than the length of the fishing pole, otherwise the fish cannot be netted when reeled all the way in. This maximum limit on the length of the bait line may be undesirable.

In the preferred embodiment of the present invention, the fishing line extends contiguously along the planar surface of the diving plane. In the released condition, the diving plane slides freely along the line in the trolling direction, minimizing drag and line breakage. The diving plane has an upstanding fin extending rearwardly, with the fishing line being guided rearwardly through the base of the fin along the diving plane. Releaseable latch means on the diving plane has a latched condition clamping the diving plane to the line, and a released condition responsive to the strike of a fish unclamping the diving plane from the line and enabling the diving plane to slide along the line in the trolling direction with the line sliding freely through the base of the fin. The line extends rectilinearly along the top planar surface of the diving plane between front and rear guide members in each of the latched and released conditions.

The invention further provides extended line life because the line is not pulled away from friction grip jaws or the like in a ripping or frictionally releasing type manner. Instead, a latch arm, for example made of steel or the like, is subjected to frictional clamping and unclamping wear and tear with frictional jaws, whereby to substantially diminish the line breakage by saving the line from undergoing such stress.

DETAILED DESCRIPTION

Figure 1:
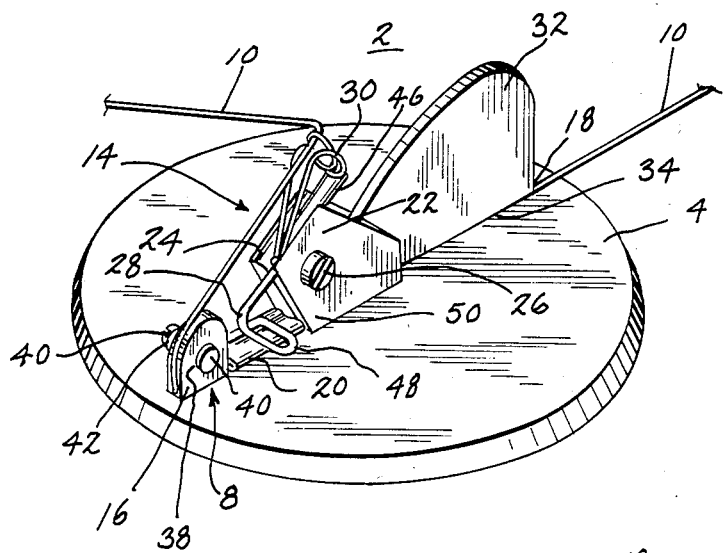
FIG. 1 is a top perspective view of a fishing diver constructed in accordance with the invention.
Figure 2:
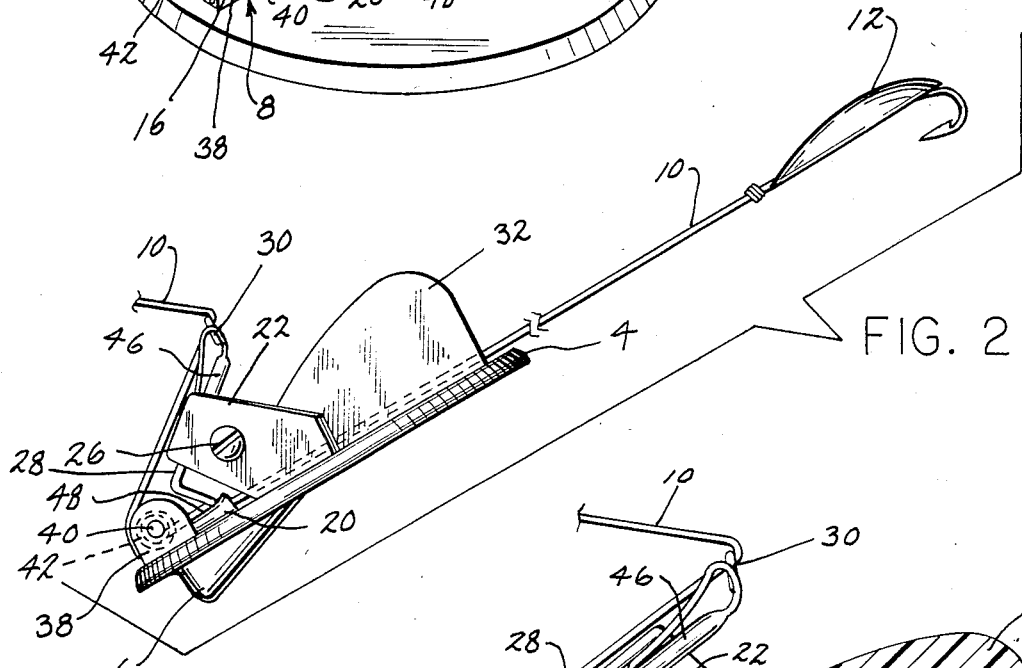
FIG. 2 is a side elevational view of the diver of FIG. 1.
Figure 3:
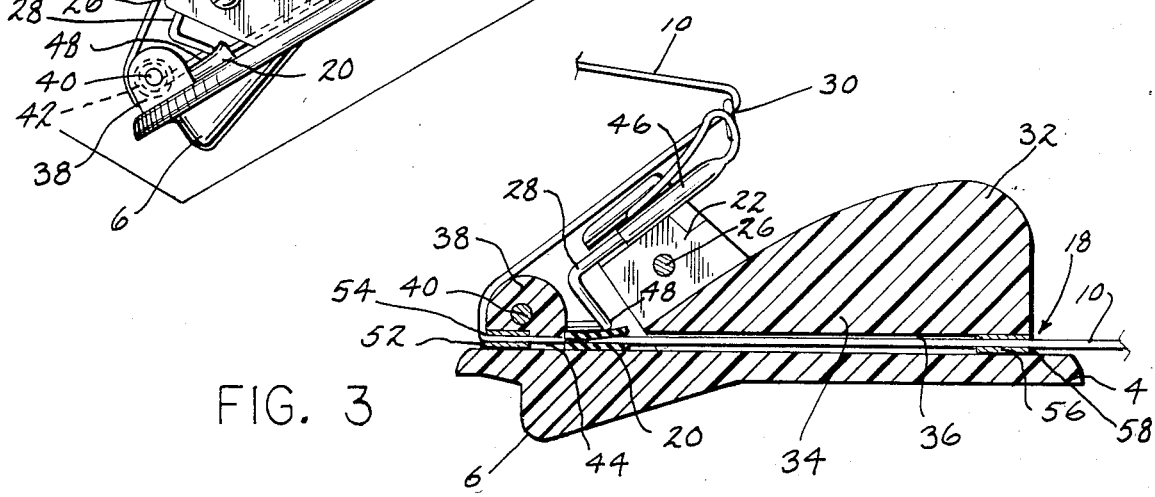
FIG. 3 is a cross sectional view of the diver of FIGS. 1 and 2.
Figure 4:
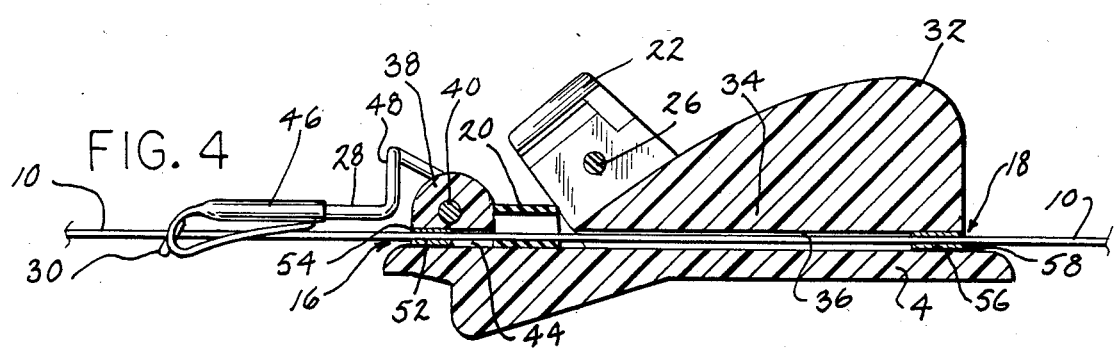
FIG. 4 is a view like FIG. 3 but showing a released condition.

FIG. 1 shows a fishing diver 2 comprising a diving plane 4 which may be forwardly weighted at 6, FIG. 2. Guide means 8 on the diving plane guides a fishing line 10 along the plane of diving plane 4. One end of line 10, for example the right end, extends to a baiting lure or the like 12, and the other end of the line, for example the left end of line 10, is reelable, such as from a fishing pole, for trolling or the like. Releaseable latch means 14 on diving plane 4 has a latched condition, FIGS. 1–3, clamping diving plane 4 to line 10 such that upon trolling the diver dives downwardly, FIG. 2, at an angle to the trolling line, left end of 10. Latch means 14 has a released condition, FIG. 4, responsive to the strike of a fish on lure 12 unclamping diving plane 4 from the line and enabling free sliding passage of line 10 through guide means 8 along the plane of diving plane 4. Line 10 extends contiguously along the top planar surface of diving plane 4 in both the latched and released conditions of latch means 14.

Guide means 8 includes front and rear guide members 16 and 18 on the top planar surface of diving plane 4. Line 10 extends through and rectilinearly between front and rear guide members 16 and 18 in each of the latched and released conditions of latch means 14. Latch means 14 includes gripper means 20 for gripping line 10 between front and rear guide members 16 and 18 to clamp diving plane 4 to line 10. In one form, gripper means 20 is a resiliently collapsible tubular member, for example soft rubber. Line 10 extends through the tubular member 20 and is gripped by and clamped between opposing inner surfaces of tubular member 20 in the latched condition.

Latch means 14 includes friction grip jaw means on the diving plane provided by a pair of upstanding jaws 22 and 24 spaced by a gap adjusted by screw 26. Diving plane 4 and upstanding jaws 22 and 24 are typically made of plastic and integrally molded. A pivoted latch arm 28 has a latched position frictionally engaged between and held by jaws 22 and 24 and including an eyelet 30 guiding line 10 therethrough then forwardly, FIGS. 1–3, to front guide member 16. Latch arm 28 in the latched position, FIGS. 1–3, coacts with line gripper means 20 to clamp diving plane 4 to line 10. Latch arm 28 is frictionally released from jaws 22 and 24 upon the strike of a fish on lure 12. Turning of screw 26 clockwise, FIG. 1, will increase the frictional gripping of latch arm 28 by jaws 22 and 24, which in turn requires a larger fish before jaws 22 and 24 release latch arm 28 to a released unlatched condition. The latch arm 28 in the released position unclamps gripper means 20 and line 10. In the released position of latch arm 28, FIG. 4, line 10 extends rectilinearly rearwardly through eyelet 30 and front and rear guide members 16 and 18.

Diving plane 4 has an upstanding fin 32, for example of integrally molded plastic, extending rearwardly. Fishing line 10 is guided rearwardly through the base 34 of the fin along the top planar surface of diving plane 4. The base 34 of fin 32 has a longitudinal forward-rearward passage 36, FIG. 3, drilled or otherwise formed therethrough. In the released position, diving plane 4 may slide along line 10 in the trolling direction, with line 10 sliding freely through the base of fin 32 in passage 36.

Friction grip jaws 22 and 24 are forward of fin 32. A front upstanding tab 38 on the diving plane, for example of integrally molded plastic, is forward of jaws 22 and 24 and pivotally mounts latch arm 28, as at screw 40 extending through a looped portion 42 at the pivoted end of latch arm 28 and through tab 38. Tab 38 also guides line 10 rearwardly therethrough along passage 44 drilled or otherwise formed longitudinally forward-rearward through the base of tab 38 along the top planar surface of diving plane 4. Latch arm 28 has eyelet 30 at the end thereof opposite front tab 38. In the latched position, latch arm 28 is pivoted from tab 38 rearwardly and frictionally engaged and held by jaws 22 and 24 along central portion 46 between the eyelet end at 30 and the pivotally mounted end 42. Arm 28 includes a line clamping portion 48 coacting in the latched position with line gripper means 20 between the base 50 of jaws 22 and 24 and the front tab 38 to clamp diving plane 4 to line 10. Upon release, arm 28 pivots forwardly to the released position, FIG. 4, unclamping gripper means 20 and line 10, the line extending freely through eyelet 30 on arm 28 then rearwardly through tab 38 and then through fin 32.

In the latched clamped position, the top outer surface of tubular member 30 is engaged by line clamping portion 48 of arm 28 to collapse tubular member 20 and press the bottom outer surface of tubular member 20 against the top of diving plane 4. This in turn causes the opposing inner surfaces of tubular member 20 to clamp and grip line 10 therebetween. Line 10 is thus gripped and clamped between the inner surfaces of a soft rubber tubular member 20 rather than being gripped between jaw members or the like such as 22 and 24. This provides extended line life because the line is not pulled away from such jaw type members in a ripping or frictionally releasing type manner. Instead, central portion 46 of latch arm 28 is gripped between jaws 22 and 24. Arm 28 is made of steel or the like, and thus not subject to damage or breakage from its frictional engagement with and release from jaws 22 and 24. In alternate species, tube 20 is eliminated, and line clamping portion 48 of arm 28 is the line gripper means or is provided with a rubber or the like wrap therearound to grip line 10 and frictionally clamp it against the top of diving plane 4. Likewise in these species, line breakage is significantly reduced because the clamping function does not require that the line be ripped or pulled away from frictional jaws or the like upon the strike of the fish. Instead, latch arm 28 at portion 46 is subject to such frictional unclamping wear, thus saving the line from undergoing such stress. This substitution of latch arm portion 46 for line 10 in being subjected to the frictional clamping and unclamping wear and tear substantially diminishes line breakage.

A front bushing 52 with a rounded front outer edge 54 is provided in the front of front tab 38 at the base thereof in passage 44 along the top planar surface of diving plane 4 for guiding line 10 therethrough. A rear bushing 56 with a rounded rear outer edge 58 is provided in the rear of fin 32 at the base thereof in passage 36 along the top planar surface of diving plane 4 for guiding the line therethrough. This has been found to further reduce line breakage.

It is recognized that various alternatives and modifications are possible within the scope of the appended claims.

We claim:

1. A fishing diver comprising a diving plane, guide means on said diving plane for guiding a fishing line along the plane of said diving plane through said guide means, one end of the line extending to a baiting lure and the other end of the line being reelable for trolling, and releaseable latch means on said diving plane having a latched condition clamping said diving plane to the line such that upon trolling said diver dives downwardly at an angle to the trolling line, said latch means having a released condition responsive to the strike of a fish on the lure unclamping said diving plane from the line and providing free sliding passage of the line through said guide means along the plane of said diving plane, said line through the guide means extending substantially parallel to said plane of said diving plane in said released condition of said latch means.

2. The invention according to claim 1 wherein said line extends contiguously along a top planar surface of said diving plane in both said latched and said released conditions of said latch means.

3. The invention according to claim 2 wherein said guide means includes front and rear guide members on said top planar surface of said diving plane, said line extending through each of said front and rear guide members in each of said latched and released conditions of said latch means.

4. The invention according to claim 3 wherein said line extends rectilinearly between said front and rear guide members in each of said latched and released conditions of said latch means, and wherein said latch means includes gripper means for gripping the line between said front and rear guide members to clamp said diving plane to the line.

5. The invention according to claim 4 wherein said latch means includes friction grip jaw means on said diving plane and a pivoted latch arm on said diving plane having a latch position frictionally engaged and held by said jaw means and including an eyelet guiding the line therethrough then forwardly to said front guide member, said pivoted arm in said latched position coacting with said line gripper means to clamp said diving plane to the line, said pivoted latch arm being frictionally released from said jaw means and pivoting to a released position upon the strike of a fish, said pivoted latch arm in said released position unclamping said gripper means and line.

6. The invention according to claim 5 wherein in said released position of said pivoted latch arm the line extends rectilinearly rearwardly through said eyelet of said pivoted latch arm and said front and rear guide members.

7. A fishing diver comprising a diving plane having an upstanding fin extending rearwardly, a fishing line being guided rearwardly through the base of said fin along said diving plane with one end of the line extending to a baiting lure and the other end of the line being reelable for trolling, and releaseable latch means on said diving plane having a latched condition clamping said diving plane to the line such that upon trolling said diver dives downwardly at an angle to the trolling line, said latch means having a released condition responsive to the strike of a fish on the lure unclamping said diving plane from the line and enabling said diving plane to slide along said line in the trolling direction with the line sliding freely through the base of said fin.

8. The invention according to claim 7 wherein said latch means includes:
 a pair of upstanding friction grip jaws on said diving plane forward of said fin;
 a pivoted latch arm;
 a front upstanding tab on said diving plane forward of said jaws pivotally mounting said pivoted latch arm and also guiding the line rearwardly through said tab, said pivoted latch arm having an eyelet at the end thereof opposite said front tab, the line extending through said eyelet then through said tab, said pivoted latch arm having a latched position pivoted rearwardly and frictionally engaged and held by said jaws along a central portion of said arm between the eyelet end and the pivotally mounted end, said arm including a line clamping portion coacting in said latched position with line gripper means between the base of said jaws and said front tab to clamp said diving plane to the line, said arm being frictionally released from said jaws upon the strike of a fish and pivoting forwardly to a released position unclamping said gripper means and line, the line extending freely through said eyelet on said arm then rearwardly through said tab and then through said fin.

9. The invention according to claim 8 wherein said line gripper means comprises a resiliently collapsible tubular member between said front tab and the base of said jaws, the line extending through said tubular member and being gripped by and clamped between opposing inner surfaces of said tubular member when said pivoted latch arm is in said latched position, the top outer surface of said tubular member being engaged by said line clamping portion of said arm to collapse said tubular member and press the bottom outer surface of said tubular member against the top of said diving plane.

10. The invention according to claim 8 comprising a front bushing with a rounded front outer edge in the front of said front tab at the base thereof along said diving plane for guiding the line therethrough, and a rear bushing with a rounded rear outer edge in the rear of said fin at the base thereof along said diving plane for guiding the line therethrough.

11. A fishing diver comprising a diving plane, guiding means on said diving plane for guiding a fishing line, one end of the line extending to a baiting lure or the like and the other end of the line being reelable for trolling or the like, and a releaseable latch member on said diving plane having a latched condition frictionally engaged with latching means on said diving plane at a first portion of said latch member and clamping said diving plane to the line at a second portion of said latch member such that upon trolling said diver dives downwardly at an angle to the trolling line, said latch member having a released condition responsive to the strike of a fish on the lure unclamping said first portion of said latch member from said latching means to unclamp said diving plane from said line at said second portion of said latch member and providing free sliding passage of the line through said guide means, said strike of said fish causing frictional unclamping of said first portion of said latch member such that said first portion of said latch member suffers frictional clamping and unclamping wear and tear, whereby to minimize line breakage.

* * * * *